United States Patent [19]

Führing et al.

[11] Patent Number: 4,788,776

[45] Date of Patent: Dec. 6, 1988

[54] APPARATUS FOR RECOVERY OF SOLVENT VAPOR IN A DRYING PROCESS

[75] Inventors: Heinrich Führing, Augsburg; Helmut Sieber, Aystetten, both of Fed. Rep. of Germany

[73] Assignee: Bowe Reinigungstechnik GmbH, Augsburg, Fed. Rep. of Germany

[21] Appl. No.: 26,474

[22] Filed: Mar. 16, 1987

[30] Foreign Application Priority Data

Mar. 21, 1986 [DE] Fed. Rep. of Germany ....... 3609587

[51] Int. Cl.⁴ .............................................. F26B 21/06
[52] U.S. Cl. ........................................ 34/76; 68/18 C
[58] Field of Search ................... 34/72, 73, 75, 76, 77, 34/79, 80; 68/18 C

[56] References Cited

U.S. PATENT DOCUMENTS

| | | | |
|---|---|---|---|
| 4,281,465 | 8/1981 | Zimmerman et al. | 34/80 |
| 4,480,393 | 11/1984 | Flink et al. | 34/80 |
| 4,494,317 | 1/1985 | Biagi et al. | 34/76 |
| 4,513,590 | 4/1985 | Fine | 34/80 |

FOREIGN PATENT DOCUMENTS

| | | |
|---|---|---|
| 0130546 | 6/1984 | European Pat. Off. |
| 2214153 | 8/1976 | Fed. Rep. of Germany |
| 1303062 | 7/1962 | France |
| 110711 | 11/1947 | Sweden |
| 1179986 | 3/1967 | United Kingdom |

Primary Examiner—Henry A. Bennett
Attorney, Agent, or Firm—Herbert Dubno

[57] ABSTRACT

The apparatus recovers solvent vapor and is used in a process for drying goods. A closed system of pipes guides an air flow through a heat exchanger comprising a condenser and an air heater. The system of pipes has a blower for providing a circulation forming this air flow and a switching means for the air flow comprising a plurality of valves and at least one pipe segment by which an adsorber is connectable in series in the circulation with a processing container. The adsorber is connectable by the blower or directly in the circulation with an outlet of the processing container. Advantageously at least one other pipe segment bypassing the heat exchanger with the switching means is provided so that the circulation only runs through the processing container, the blower and the adsorber without running through the heat exchanger. Furthermore at least one additional pipe segment and at least one additional switching means are provided bypassing the processing container. Advantageously also one device for sensing the equality of the vapor concentrations at the entrance and outlet to the adsorber can be provided as well as another associated device for control of the process.

11 Claims, 3 Drawing Sheets

APPARATUS FOR RECOVERY OF SOLVENT VAPOR IN A DRYING PROCESS

FIELD OF THE INVENTION

Our present invention relates to an apparatus for recovery of solvent vapor in a drying process and, more particularly, in a drying process which makes use of a flow of air to entrain solvent from articles which have been treated therewith and are dried at least in part by the air stream.

BACKGROUND OF THE INVENTION

For recovery of solvent vapor from the drying of articles with the help of an air stream, a closed system of pipes guide the air stream through a heat exchanger comprising a condenser and an air heater. This system of pipes has a blower for circulation of the air flow and a switching means comprising a plurality of valves and at least one pipe segment by which a solvent adsorber is connectable in series in the circulation with the article-processing vessel.

In the dry cleaning apparatus described in German Pat. No. 22 14 153, for example, the drying of the articles is effected with recovery of the solvent vapor from the air stream in a first stage by condensation of the solvent followed by heating the air flow recycled passing over the goods.

A recovery by adsorption instead of condensation is not practiced in an early stage, since the solvent-vapor concentration at the start of the drying is much too high for an adsorption process. Therefore, in the known apparatus during the drying by condensation, the adsorber which contains active carbon as an adsorbing material is shunted by a bypass. Then toward the end of the drying, when the gas concentration has been reduced to a small value, the adsorber is switched into the circulation.

In this known arrangement, the adsorber is located upstream of the processing container and downstream of the outlet of the heater. It is thus acted upon by the heat picked up by the air flow from the heater. As a consequence, the adsorption capacity of the adsorber is greatly diminished inasmuch as adsorption capacity of an active carbon adsorbent declines with rising temperature. This phenomenon is noted even when the heater is switched off since substantial heat is retained by the heater and hence is transferred to the air stream traversing the heater.

As a result, up to now a correspondingly large amount of active carbon has been required as an adsorption agent for sufficient adsorption to occur in the solvent cleaning industry under these conditions. The adsorber, because of the volume of adsorbent required, cannot be put in the machine housing, but must be placed instead outside of it.

Furthermore, this adsorber requires correspondingly large devices and periodic effort for desorption which may require the use of steam or hot gas. Because of the various cycle times for the desorption cycle and drying times with large-volume adsorbers it is generally necessary to use a twin adsorber with individual heat exchangers and also a comparatively large carbon capacity and to alternate between the adsorbers, desorbing one while the other is operating in an adsorption mode.

OBJECTS OF THE INVENTION

It is an object of our invention to provide an improved apparatus for recovery of solvent vapor in a drying process for goods, which will avoid drawbacks of earlier apparatuses for this purpose.

It is another object of our invention to provide an improved apparatus for recovery of solvent vapor in a drying process for solvent-treated articles in which an effective adsorption of residual solvent vapor at the end of the drying is attained, without venting to the atmosphere, by an arrangement of the adsorber, which permits smaller dimensions of the adsorber and thus allows it to be placed in the machine housing.

SUMMARY OF THE INVENTION

These objects and others which will become more readily apparent hereinafter are attained, in accordance with our invention, in an apparatus for recovery of solvent vapor in the drying of solvent-treated articles by an air flow in which a closed system of pipes guides an air flow through a heat exchanger comprising a condenser and an air heater, this system of pipes having a blower for providing a circulation forming the air flow and a switching means comprising a plurality of valves and at least one pipe segment by which a solvent adsorber is connectable in series in the circulation with the processing container.

According to our invention, the adsorber is connectable through only the blower or directly in the circulation with the outlet of the processing container. Therefore, it is located directly after or downstream of the processing container or immediately downstream of the adsorber and ahead of the heat exchanger in the direction of the resulting circulation. Because of this arrangement of the adsorbers according to our invention a disadvantageous heating of the adsorber by the air flow is avoided, whether the heater is turned on or off, since it delivers its heat to the material being dried in passing through the processing container and is cooled. The adsorber can thus be dimensioned correspondingly smaller for receipt of the same solvent gas vapors.

In a further feature of our invention, at least one other pipe segment with switching means bypassing the heat exchanger is provided, so that the circulation only runs through the processing container, the blower and the adsorber without running through the heat exchanger at all. Thus the undesirable heating of the air flow and disturbing impairment of the adsorber by residual heat of the heat exchanger is reliably avoided,. there is thus only a simple cycle or circulation path between the processing container and the adsorber which, since it can be maintained at a lower temperature, is more fully effective. Less adsorption agent is required than has hitherto been the case. The size of the adsorber used can be further reduced. We can use a single-bed adsorber which is regenerated each time within the duration of a cleaning operation (i.e. functionally alternating adsorbers need not be provided).

A further improvement according to our invention can be attained when at least one additional pipe segment and at least one additional switching means are provided bypassing the processing container itself, thus providing a circulation only through the adsorber and the heat exchanger. This can be attained by a bypass around the container which can be connected by valves parallel to the container while its entrances and outlets are closed. Thus in combination with the previously described features a desorption of the adsorber during a cleaning using the heat exchanger as the heat source can be achieved, since as mentioned earlier, a smaller quantity of adsorption material needs to be regenerated.

A bypass of a processing container by a bypass pipe has already been described in the Swedish Pat. No. 110,711. However, an overload of the adsorbers, when they are not of sufficient size is unavoidable, because of the arrangement there described of the adsorber between the heater and the condenser.

To attain the best possible utilization of the adsorbers with the smallest quantities of adsorption material, there is positioned a device for measurement of the solvent vapor concentration in the air flow at an entrance and at an outlet to the adsorber and a device for providing a control signal on detection of approximate equality of the solvent vapor concentrations at the entrance and at the outlet of the adsorber.

Up to now, the adsorber was usually so dimensioned that the previously described emission boundaries or limits at the adsorber outlet are not exceeded in every feed through of air corresponding to the receptacle volume. One had to have a considerable quantity of adsorption agent and required alternating units because of the long desorption time.

With the arrangement according to our invention, it is possible to maintain the air circulation only until the concentration of vapors at the entrance to the adsorber is equal to the concentration of vapors at the outlet to the adsorber which corresponds to the desired value. The adsorption agent quantity is thus selected to allow this equality upon passage therethrough of an air volume equal to that in the apparatus, essentially the volume of the processing container.

Our invention overcomes the disadvantages existing up to now and satisfies the objects set forth above. It provides a venting-free cleaning system by the organic incorporation of a hot air heatable, space saving single charge/single bed adsorption agent in the conventional condensation drying system of a cleaning unit. This is accomplished using a plurality of internal controllable pipe segments, which allow the independent use of different functioning circulations without an additional heat exchanger for the adsorber.

Our invention is illustrated in connection with a fabric dry cleaning unit. It is, however, also applicable in the treatment of fabrics but also can be used in the treatment of other objects such as metal, hides or electronic components with an organic solvent which removes materials from the parts and/or these objects and in which solvent recovery is required.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
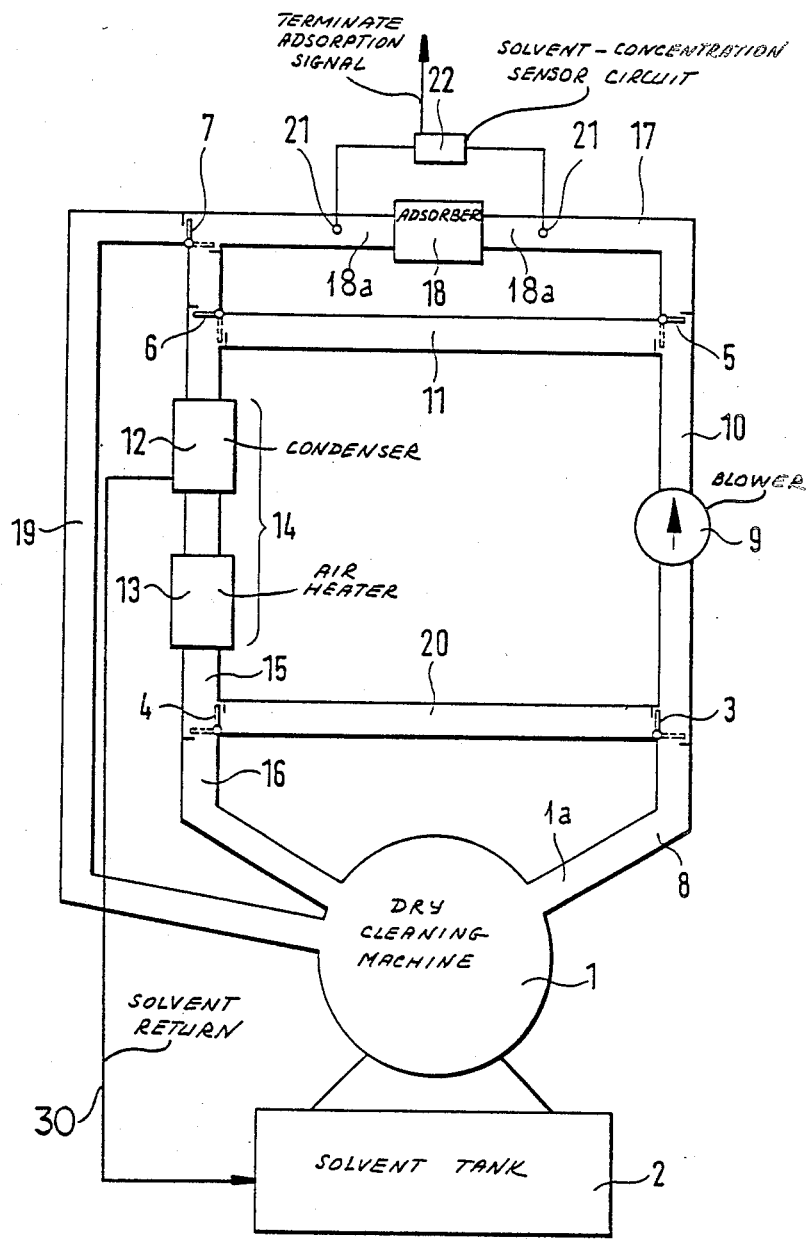
FIG. 1 is a schematic diagram of a dry cleaning unit equipped with one embodiment of an apparatus for solvent vapor recovery according to our invention.

In FIG. 1, the processing container 1 is a drum of a dry cleaning machine and is mounted on a part of the machine frame 2 which is a supply tank for a solvent at the same time. The solvent is returned to the tank 2 by a line 30 from the recovery condenser.

The processing container 1 is connected to a system of pipes 8, 10, 11, 17, etc., which have switching means comprising a plurality of valves, for example, switching or shut off valves 3, 4, 5, 6 and 7. According to the blocking/unblocking configuration of these valves the circulation paths through this system of pipes can be changed. Switching and control devices for operation of such shut off valves are known and thus not shown in detail.

Following the usual wash and spin-dry process in the illustrated unit the drying of the articles in the drum of the processing container 1 begins. This involves entraining the solvent found in the articles and the processing container 1 from the latter in an air stream without venting the air.

Air is pulled into the system of pipes 8, 10, 11, 17, etc., with the valve configuration shown in the drawing through the pipe segment 8 from the outlet 1a to the processing container 1 by a blower 9 which is located in a connected pipe segment 10 and is circulated in the direction of the arrow in the drawing. It is fed through a pipe segment 11 to the inlet of a heat exchanger 14 comprising a condenser 12 and an air heater 13 which is located in pipe segment 15. After leaving the heat exchanger 14 air flows by a pipe segment 16 back to the processing container 1.

Furthermore, an auxiliary pipe segment 17 is provided parallel to the pipe segment 11 which leads through an adsorber 18 which however in FIG. 1 is separated and closed off from the rest of the pipe system With the indicated configurations of valves 5, 6 and 7.

Another pipe segment 19 forming a bypass is provided parallel to the pipe segment 15 with the heat exchanger 14 which goes around the heat exchanger 14 and leads directly to an entrance of the processing container 1 while the other end of this other pipe segment 19 is shown closed off by the valve 7.

The valves 5, 7 and 4 are moved into the configuration shown by the dotted lines in the drawing at the end of the condensation-drying by a control device (not shown). The air flow produced by the blower 9 is circulated through the processing container 1 and the adsorber 18. The solvent vapor is adsorbed in the adsorber 18 and quickly removed from the processing container 1 after the condensation removal of the vapor has been completed. After that, the heater 13 and the condenser 12 of the heat exchanger 14 can be shut off. Immediately after the adsorption step they are placed in operation once again to regenerate and/or desorb the adsorber 18.

An additional pipe segment 20, which is a bypass for the processing container 1, is provided between the pipe segments 8 and 16. During the drying this additional pipe segment 20 is closed. An additional switching means comprising shut off valves 3 and 4 is provided. The shut off valves 3, 4, 5 and 6 are brought into the configuration illustrated by the dotted lines to regenerate the adsorber 18 while the valve 7 is moved back into its initial configuration closing the other pipe segment 19.

As a result, an air circulation driven by the blower 9 is generated, the air stream being heated in the heater 13 and then entering the adsorber 18 at an appropriately higher temperature.

The retained solvent is then desorbed and fed to the condenser 12, where it is then condensed and heated anew in the heater 12. After a little while the adsorber 18 is again ready for operation. During this cleaning and/or desorption cycle articles can be removed from the processing container 1 and a fresh wash and/or cleaning cycle begun.

A device or sensor 21 is provided for measurement of the solvent gas concentration at the inlet 18b and outlet 18a to the adsorber 18 in pipe segment 17. The measurement results are compared with each other in another device or comparator 22 which supplies a signal ending the adsorption process when the signals from the inlet and outlet sides agree.

Figure 2:
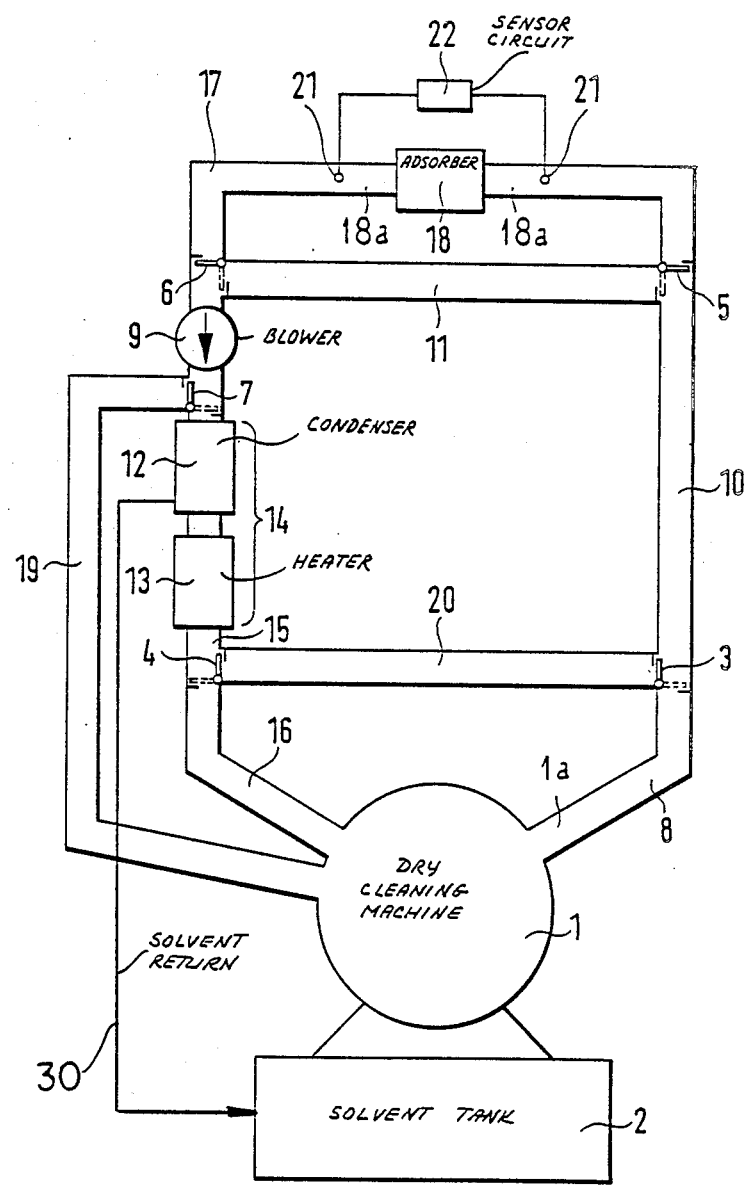
FIG. 2 is a schematic diagram of a dry cleaning unit equipped with another embodiment of an apparatus for solvent vapor recovery according to our invention.

FIG. 2 shows a variant of the apparatus shown in FIG. 1. They differ in that in the apparatus of FIG. 2 the blower 9 is provided in the path of the circulation downstream of the adsorber 18 and the pipe segment 11 and upstream of the branch to the other pipe segment 19 between the shut off valves 6 and 7. This arrangement has, in contrast to that of FIG. 1, the advantage that the adsorber 18 is located in a low pressure region and the cooler 12 in a high pressure region. The blower 9 suction is beneficial for the desorption process. Otherwise the operation of this arrangement, particularly the operating sequence of the individual shut off valves, is the same as described in FIG. 1.

Figure 3:
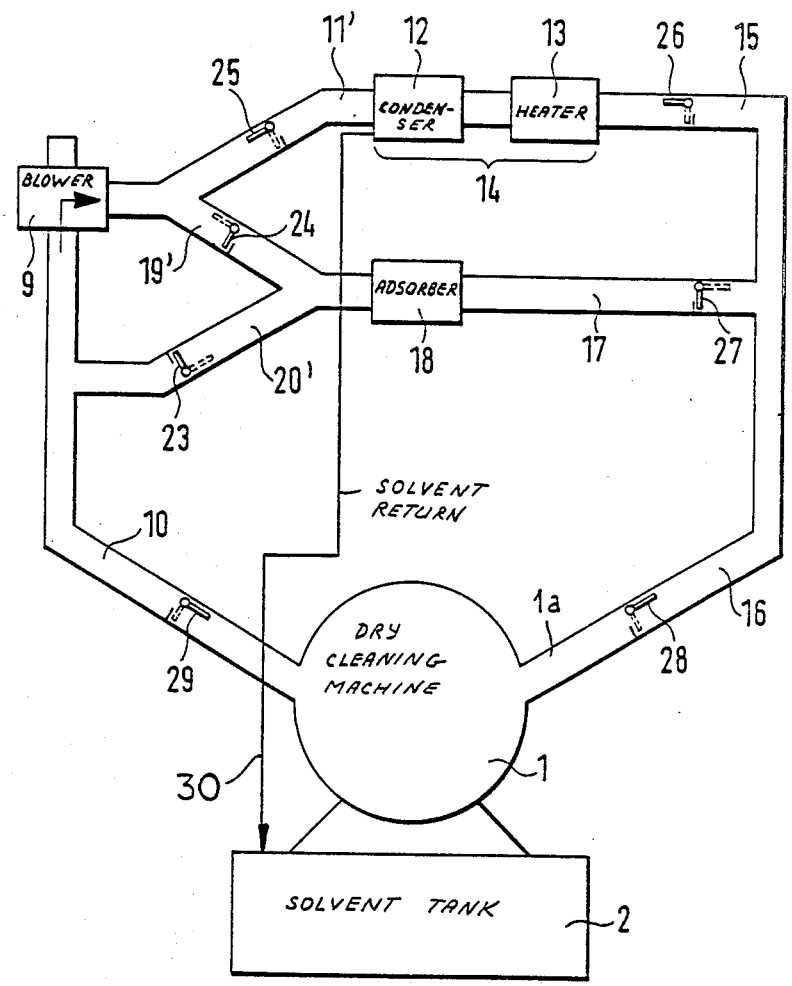
FIG. 3 is a schematic diagram of a chemical cleaning unit equipped with another example of an apparatus for solvent vapor recovery according to our invention.

The arrangement according to FIG. 3 deviates from the configuration of pipes shown in FIGS. 1 and 2. The above described circulations can be produced here in a similar way with the help of the pipe segments 11', 19' and 20' having shut off valves 24, 25 and 23 which of course are not identical with the pipe segments 11, 19 and 20 of FIGS. 1 and 2. However, as is easily ascertainable from the drawing, these pipe segments 11', 19' and 20' function similarly to segments 11, 19 and 20 in operation.

Thus in the apparatus according to FIG. 3, similarly after the wash and spin-dry steps, the drying circulation running between the processing container 1 and the heat exchanger 14 is set by opening the shut off valves 25 and 26 and 28 and 29 and switching in the blower 9 which produces an air flow in the direction of the arrow over the articles found in the drum of the processing container 1. All other shut off valves 23, 24 and 27 are closed. After the drying using condensation and heating while the blower 9 continues to run, the shut off valves 24 and 27 and 28 and 29 are opened and all others are closed. During this adsorption circulation the residual solvent gases or vapors are removed from the air flow and from the drying.

After that, while the articles are removed from the drying housing or processing container 1 and a new cleaning process is begun on running the blower 9, the shut off valves 25 and 26 and 23 and 27 are opened and the valves 28 and 29 closed. The air pulled in from the blower 9 is forced through the heat exchanger 14. It issues at a higher temperature from the air heater 13 into the adsorber 18 and takes along the solvent received in the above adsorption so that it is transported by the blower 9 into the connected air condenser 12 and there is condensed.

In regard to the arrangement according to FIG. 3, a less desirable embodiment results when the shut off valves 26 and 27 are eliminated. The valves 28 and 29 are however required when during the desorption process a fresh washing and/or cleaning cycle is already started.

We claim:

1. In an apparatus for recovery of solvent vapor used in a process for drying articles with the help of an air flow, in which a closed system of pipes guides said air flow through a heat exchanger comprising a condenser and an air heater, said system of pipes having a blower for providing a circulation forming said air flow and a switching means for channeling said air flow comprising a plurality of valves and at least one pipe segment by which an adsorber is connectable in series in said circulation with a processing container, the improvement wherein said adsorber is directly connectable in said circulation with an outlet of said processing container, optionally also having a blower positioned between said adsorber and said outlet.

2. The improvement according to claim 1 wherein at least one other pipe segment bypassing said heat exchanger with said switching means is provided because of which said circulation only runs through said processing container, said blower and said adsorber without running through said heat exchanger.

3. The improvement according to claim 1 wherein at least one additional pipe segment and at least one additional switching means are provided by passing said processing container.

4. The improvement according to claim 1 wherein one device for measurement of the solvent vapor concentration in said air flow at an entrance to said adsorber and at an outlet to said adsorber and another device for providing a control signal on detection of approximate equality of said solvent vapor concentrations at said entrance and at said outlet of said adsorber.

5. An apparatus for the treatment of articles with a solvent, comprising:
a receptacle for said articles having an inlet and an outlet for an air circulation in a closed path through said receptacle;
a pipe system having a plurality of branches connected to said inlet and said outlet;
a condenser and a heater connected in series in one branch of said pipe system;
a blower in said pipe system having an intake side directly connected to said outlet;
an adsorber in a second branch of said pipe system between a discharge side of said blower and said condenser in said one branch, said heater being connected to said inlet, said pipe system having a third branch connected in shunt between said inlet and said outlet, and a fourth branch connected in shunt across said adsorber; and
valve means between said branches for forming:
a first closed circulation path from said outlet directly to said blower, from said blower through said fourth branch, from said fourth branch through said condenser and said heater in series, and then to said inlet and through said receptacle for removing residual solvent from said articles in a stream of air displaced along said first path and recovering solvent from the stream displaced along said first path by condensation, said adsorber being closed off from said first path,
a second closed circulation path from said outlet directly to said blower and then to said adsorber before returning to said receptacle for removing solvent vapor from an air stream circulated along said second path by adsorption, and a third closed circulation path from said air heater through said third branch to said blower and then from said blower through said adsorber and said condenser to desorb solvent from said adsorber and recover the desorbed solvent by condensation.

6. The apparatus defined in claim 5 wherein, in said second closed circulation path, the air stream thereof passes through said one branch to said inlet.

7. The apparatus defined in claim 5 wherein said pipe system includes a fifth branch in shunt across said one branch and said condenser and heater, said second closed circulation path bypassing said condenser and said heater and passing through said fifth branch to said receptacle.

8. An apparatus for the treatment of articles with a solvent, comprising:
   a receptacle for said articles having an inlet and an outlet for an air circulation in a closed path through said receptacle;
   a pipe system having a plurality of branches connected to said inlet and said outlet;
   condenser and a heater connected in series in one branch of said pipe system;
   a blower in said pipe system having an intake side and a discharge side;
   an adsorber in a second branch of said pipe system between said intake side of said blower and said receptacle, said discharge side of said blower being connected with said condenser of said one branch, said heater being connected to said inlet, said pipe system having a third branch connected in shunt between said inlet and said outlet, and a fourth branch connected in shunt across said adsorber; and
   valve means between said branches for forming:
      a first closed circulation path from said outlet directly to said blower through said fourth branch, from said blower through said condenser and said heater in series, and then to said inlet and through said receptacle for removing residual solvent from said articles in a stream of air displaced along said first path and recovering solvent from the stream displaced along said first path by condensation, said adsorber being closed off from said first path,
      a second closed circulation path from said outlet directly to said adsorber and then to said blower before returning to said receptacle for removing solvent vapor from an air stream circulated along said second path by adsorption, and
      a third closed circulation path from said air heater through said third branch to said adsorber and then from said adsorber through said blower and said condenser to desorb solvent from said adsorber and recover the desorbed solvent by condensation.

9. The apparatus defined in claim 8 wherein, in said second closed circulation path, the air stream thereof passes through said one condenser and heater to said inlet.

10. The apparatus defined in claim 8 wherein said pipe system includes a fifth branch in shunt across said one branch and said condenser and heater, said second closed circulation path bypassing said condenser and said heater and passing through said fifth branch to said receptacle.

11. An apparatus for the treatment of articles with a solvent, comprising:
   a receptacle for said articles having an inlet and an outlet for an air circulation in a closed path through said receptacle;
   a pipe system having a plurality of branches connected to said inlet and said outlet;
   a condenser and a heater connected in series in one branch of said pipe system;
   a blower in said pipe system having an intake side directly connected to said outlet;
   an adsorber in a second branch of said pipe system between a discharge side of said blower and said condenser in said one branch, said heater being connected to said inlet,; and
   valve means between said branches for forming:
      a first closed circulation path from said outlet directly to said blower, from said blower through said condenser and said heater in series, and then to said inlet and through said receptacle for removing residual solvent from said articles in a stream of air displaced along said first path and recovering solvent from the stream displaced along said first path by condensation, said adsorber being closed off from said first path,
      a second closed circulation path from said outlet directly to said blower and then to said adsorber before returning to said receptacle for removing solvent vapor from an air stream circulated along said second path by adsorption, and
      a third closed circulation path from said air heater to said blower and then from said blower through said adsorber and said condenser to desorb solvent from said adsorber and recover the desorbed solvent by condensation, said receptacle being closed off during displacement of air along said third closed circulation path.

* * * * *